(12) United States Patent
Dempo

(10) Patent No.: US 8,244,908 B2
(45) Date of Patent: Aug. 14, 2012

(54) SYSTEM, METHOD AND PROGRAM FOR DISTRIBUTED EVENT DETECTION

(75) Inventor: Hiroshi Dempo, Tokyo (JP)

(73) Assignee: NEC Corporation, Tokyo (JP)

( * ) Notice: Subject to any disclaimer, the term of this patent is extended or adjusted under 35 U.S.C. 154(b) by 604 days.

(21) Appl. No.: 12/404,470

(22) Filed: Mar. 16, 2009

(65) Prior Publication Data
US 2009/0252175 A1    Oct. 8, 2009

(30) Foreign Application Priority Data

Apr. 3, 2008    (JP) ................. P2008-096967

(51) Int. Cl.
*G06F 15/173*    (2006.01)
(52) U.S. Cl. ........ 709/238; 709/239; 709/240; 709/241; 709/242; 709/243; 709/244; 370/230; 370/230.1; 370/235; 370/237
(58) Field of Classification Search .................. None
See application file for complete search history.

(56) References Cited

U.S. PATENT DOCUMENTS

| | | | | |
|---|---|---|---|---|
| 4,999,833 A * | 3/1991 | Lee | | 370/312 |
| 5,630,127 A * | 5/1997 | Moore et al. | | 1/1 |
| 5,995,971 A * | 11/1999 | Douceur et al. | | 1/1 |
| 6,606,304 B1 * | 8/2003 | Grinter et al. | | 370/252 |
| 6,615,201 B1 * | 9/2003 | Seshadri et al. | | 1/1 |
| 6,678,635 B2 * | 1/2004 | Tovinkere et al. | | 702/179 |
| 6,678,876 B2 * | 1/2004 | Stevens et al. | | 716/126 |
| 6,714,552 B1 * | 3/2004 | Cotter | | 370/406 |
| 6,744,727 B2 * | 6/2004 | Liu et al. | | 370/228 |
| 7,065,493 B1 * | 6/2006 | Homsi | | 705/7.26 |
| 7,636,309 B2 * | 12/2009 | Alicherry et al. | | 370/230.1 |
| 7,668,794 B2 * | 2/2010 | Wang et al. | | 706/47 |
| 7,676,461 B2 * | 3/2010 | Chkodrov et al. | | 707/999.004 |
| 7,738,406 B2 * | 6/2010 | Liu et al. | | 370/256 |
| 7,814,453 B2 * | 10/2010 | Stevens et al. | | 716/126 |
| 7,869,348 B2 * | 1/2011 | Chao et al. | | 370/225 |
| 7,903,563 B2 * | 3/2011 | Schollmeier et al. | | 370/238 |
| 2004/0088148 A1 * | 5/2004 | Szymanski et al. | | 703/13 |
| 2006/0155719 A1 * | 7/2006 | Mihaeli et al. | | 707/100 |

(Continued)

FOREIGN PATENT DOCUMENTS

JP    H10269252    10/1998

(Continued)

OTHER PUBLICATIONS

Pietzuch, Petere, Hermes: A scalable event-based middleware, Jun. 2004, University of Cambridge, ISSN 1476-2986, pp. 1-180.*

(Continued)

*Primary Examiner* — Backhean Tiv

(57) ABSTRACT

A distributed event detection system for detecting a complex event by a distributed detection process, includes a plurality of broker nodes for routing events and a route node for distributing the complex event, wherein the route node comprises a detection formula decomposing unit which decomposes a complex event detection formula for detecting the complex event into a plurality of complex sub-event detection formulae; a sub-route node assignment unit which assigns a broker node as a sub-route node with respect to each of the complex sub-event detection formulae decomposed by the detection formula decomposing unit; and a complex event detecting unit which detects the complex event based on a complex sub-event detected by the sub-route node assigned by the sub-route node assignment unit.

7 Claims, 10 Drawing Sheets

U.S. PATENT DOCUMENTS

| | | | |
|---|---|---|---|
| 2008/0239958 A1* | 10/2008 | Murray et al. | 370/235 |
| 2008/0253290 A1* | 10/2008 | Schollmeier et al. | 370/237 |
| 2009/0052331 A1* | 2/2009 | Kobayashi et al. | 370/242 |
| 2009/0089078 A1* | 4/2009 | Bursey | 705/1 |
| 2009/0125550 A1* | 5/2009 | Barga et al. | 707/104.1 |
| 2009/0252175 A1* | 10/2009 | Dempo | 370/400 |
| 2009/0265320 A1* | 10/2009 | Kelley | 707/3 |
| 2010/0049866 A1* | 2/2010 | Friedman | 709/231 |
| 2010/0146108 A1* | 6/2010 | Li et al. | 709/224 |
| 2010/0217931 A1* | 8/2010 | Beaman et al. | 711/114 |

FOREIGN PATENT DOCUMENTS

| | | |
|---|---|---|
| JP | 2004-348680 | 12/2004 |
| JP | 2006101277 A | 4/2006 |
| JP | 2006-309701 | 11/2006 |
| JP | 200713804 A | 1/2007 |
| JP | 2007156700 A | 6/2007 |
| JP | 2009545043 A | 12/2009 |
| WO | 2008012198 A1 | 1/2008 |
| WO | 2009107511 A1 | 9/2009 |

OTHER PUBLICATIONS

Pietzuch, Peter et al., Composite Event Detection as a Generic Middleware Extension, Jan./Feb. 2004, IEEE Network, pp. 44-55.*

Geppert, Andreas et al., Event-based Distributed Workflow Execution with EVE, Mar. 1998, Technical Report 96.05, pp. 1-16.*

Akdere, Mert et al., Plan-based Complex Event Dectection across Distributed Sources, Aug. 24-30, 2008, ACM, pp. 1-12.*

Japanese Office Action for JP 2008-096967 mailed on Jun. 12, 2012.

* cited by examiner

SYSTEM, METHOD AND PROGRAM FOR DISTRIBUTED EVENT DETECTION

CROSS-REFERENCE TO RELATED APPLICATIONS

Priority is claimed on Japanese Patent Application No. 2008-96967, filed Apr. 3, 2008, the content of which is incorporated herein by reference.

BACKGROUND OF THE INVENTION

1. Field of the Invention

The present invention relates to a system, method and program for distributed event detection, in which complex events are detected through distributed event detection. The present invention also relates to a broker node used in a distributed event detection system.

2. Description of the Related Art

Japanese Unexamined Patent Application, First Publication, No. 2006-309701 (p. 19 and FIGS. 1 and 2) discloses an example of an event processing system. In a first embodiment thereof, devices 105a to 105f detect events, which will be collected to a process server 104a via a context-dependent distributor 103. The process server 104a has a distribution rule 107 which is previously determined by an event processing distribution control section 101. Therefore, the events detected by the devices 105a to 105f are collected to the process server 104a according to the distribution rule 107.

The process server 104a has a predetermined processing rule 108a. For example, the process server 104a executes processes according to a rule that "an application will be notified upon detection of detecting signals from radio frequency identification (RFID) tags of all components". The process server 104a notifies events to an application 106a when the rule is followed.

For example, Japanese Unexamined Patent Application, First Publication, No. 2004-348680 (paragraphs [0042] to [0047] and FIGS. 1 and 2) discloses a complex event notification system, as a related art. The system disclosed in JP 2004-348680 A receives subscribe information from a subscriber application. If the received subscribe information is detected to be a complex event, the system decomposes the complex event into sub-events. When it is determined that all publish information required by the subscribe information has been collected, the system disclosed in JP 2004-348680 A notifies a designated destination of the collected publish information.

The systems disclosed in JP 2006-309701 A and JP 2004-348680 A, however, have a problem of redundant occupation of links at the side of a server. The above systems process the events in a server-client system, in which one processing rule is processed in one process server. Traffic thus focuses on the server in these systems.

For example, in the system disclosed in JP 2006-309701 A, the events detected by the devices 105a to 105f are collected to the process server 104a and the traffic focuses on a link connected to the server.

As an exemplary device, component D=(component A, component B, and component C) will be considered in which components A to C are elements. These components may generate events in an unsynchronized manner. For example, the device may have an event traffic characteristic that the component A generates one event per second, the component B generates one event per minute and the component C generates one event per hour. In this case, an event occurs once per hour in the component D while 3,600 events occur in the component A and 60 events occur in the component B.

In order to detect an event of the component D in this case, it is only required to notify detection of the first events of the components A and B. Accordingly, the remaining event traffic redundantly occupies the links around the server. The redundantly occupied links may increase as the number of processing rules belonging to the process server 104a increases.

SUMMARY OF THE INVENTION

An exemplary object of the present invention is to provide a system, method and program for distributed event detection with reduced redundant link occupation at the side of a route node (i.e., a server) in complex event detection and reduced load for complex event detection. Another object of the present invention is to provide a broker node.

A first exemplary aspect of the present invention is a distributed event detection system for detecting a complex event by a distributed detection process. The distributed event detection system includes: a plurality of broker nodes that executes event routing; and a route node that distributes the complex event, wherein the route node includes: a detection formula decomposing unit which decomposes a complex event detection formula that detects the complex event into a plurality of complex sub-event detection formulae; a sub-route node assignment unit which assigns a broker node as a sub-route node with respect to each of the complex sub-event detection formulae decomposed by the detection formula decomposing unit; and a complex event detecting unit which detects the complex event based on a complex sub-event detected by the sub-route node assigned by the sub-route node assignment unit.

In the first exemplary aspect of the present invention, the sub-route node may include: a detection formula recursive decomposing unit which recursively decomposes the complex sub-event detection formulae decomposed by the route node or another sub-route node into a plurality of complex sub-event detection formulae; a sub-route node recursive assignment unit which recursively assigns another broker node as the sub-route node to each of the complex sub-event detection formulae decomposed by the detection formula recursive decomposing unit; and a complex sub-event detecting unit which recursively detects the complex sub-event based on the complex sub-event detected by the sub-route node assigned by the sub-route node recursive assignment unit.

In the first exemplary aspect of the present invention, the subscribe node may include a complex event detection formula generating unit which generates a complex event detection formula; and the detection formula decomposing unit may decompose the complex event detection formula generated by the subscribe node into a plurality of complex sub-event detection formulae.

In the first exemplary aspect of the present invention, the broker node and the route node may be deployed on an overlay network.

The first exemplary aspect of the present invention may further include a node group that detects the distributed event, wherein the distributed event detection system may be established as a multi-overlay network including: a dedicated overlay network provided mainly for distributed event detection; a dedicated overlay network provided mainly for atomic event routing; and a dedicated overlay network provided mainly for routing the complex event.

A second exemplary aspect of the present invention is a broker node incorporated in a distributed event detection system for detecting a complex event by a distributed detection process. The broker node includes: a function to operate as a route node which distributes the complex event; a detection formula decomposing unit which decomposes a complex event detection formula that detects the complex event into a plurality of complex sub-event detection formulae; a sub-route node assignment unit which assigns another broker node as a sub-route node with respect to each of the complex sub-event detection formulae decomposed by the detection formula decomposing unit; and a complex event detecting unit which detects the complex event based on a complex sub-event detected by the sub-route node assigned by the sub-route node assignment unit.

The second exemplary aspect of the present invention may further include: a function to operate as a sub-route node; a detection formula recursive decomposing unit which recursively decomposes the complex sub-event detection formulae decomposed by the route node or another sub-route node into a plurality of complex sub-event detection formulae; a sub-route node recursive assignment unit which recursively assigns another broker node as the sub-route node to each of the complex sub-event detection formulae decomposed by the detection formula recursive decomposing unit; and a complex sub-event detecting unit which recursively detects the complex sub-event based on the complex sub-event detected by the sub-route node assigned by the sub-route node recursive assignment unit.

A third exemplary aspect of the present invention is a distributed event detection method for detecting a complex event by a distributed detection process. The distributed event detection method includes: decomposing, by a route node that distributes the complex event, a complex event detection formula that detects the complex event into a plurality of complex sub-event detection formulae; assigning, by the route node, one of a plurality of broker nodes that executes routing the event as a sub-route node with respect to each of the decomposed complex sub-event detection formulae; and detecting, by the route node, the complex event based on a complex sub-event detected by the assigned sub-route node.

In the third exemplary aspect of the present invention may further include: recursively decomposing, by the sub-route node, the complex sub-event detection formulae decomposed by the route node or another sub-route node into a plurality of complex sub-event detection formulae; recursively assigning, by the sub-route node, another broker node as the sub-route node with respect to each of the decomposed complex sub-event detection formulae; and recursively detecting, by the sub-route node, the complex sub-event based on the complex sub-event detected by the assigned sub-route node.

A fourth exemplary aspect of the present invention is a distributed event detection unit for detecting a complex event by a distributed detection process. The distributed detection process includes causing a computer to execute: a process that decomposes a complex event detection formula which detects the complex event into a plurality of complex sub-event detection formulae; a process that assigns another broker node as a sub-route node to each of the decomposed complex sub-event detection formulae; and a process that detects the complex event based on the complex sub-event detected by the assigned sub-route node.

The fourth exemplary aspect of the present invention may further include causing a computer to execute: recursively decomposing the complex sub-event detection formulae decomposed by the route node or another sub-route node into a plurality of complex sub-event detection formulae; recursively assigning another broker node as the sub-route node with respect to each of the decomposed complex sub-event detection formulae; and recursively detecting the complex sub-event based on the complex sub-event detected by the assigned sub-route node.

DETAILED DESCRIPTION OF THE PREFERRED EMBODIMENTS

Figure 1:
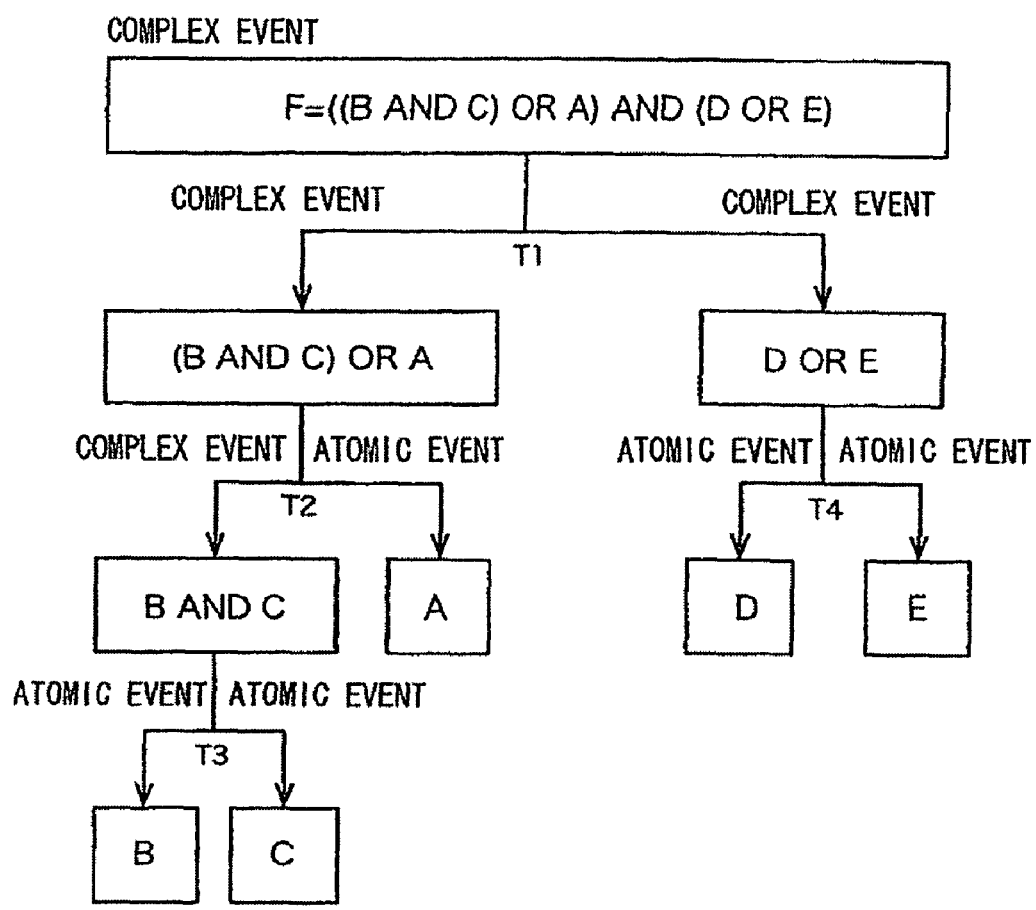
FIG. 1 is a tree diagram that shows a splitting method of a complex event formula.

An embodiment of the present invention will be described with reference to the drawings. First, a distributed event detection system of the present invention will be outlined. The present invention relates to a distributed event detection system which detects a plurality of events (i.e., state changes), processes the detected events according to a predefined rule and then notifies the process result.

The distributed event detection system of the present invention includes a communication unit using a publish-subscribe method. In the distributed event detection system using the publish-subscribe method, a publish node detects a state change and provides the detected state change to a subscribe node as event information. The devices 105a to 105f disclosed in the related art (JP 2006-309701 A) correspond to the publish node and the application 106a disclosed in the related art (JP 2006-309701 A) corresponds to the subscribe node, for example.

One or more broker nodes are provided between the publish node and the subscribe node to build a network. The broker nodes are application routers which scan the content (i.e., context) of each event and determine the next destination.

For example, anyone of the broker nodes is assigned as a complex event detection node, which detects a complex event represented by a plurality of unsplittable atomic events and then notifies the complex event to a high-order complex event detection node when generating condition of the complex event is satisfied.

In the present invention, a complicated, complex event formula (i.e., a single complex event formula with many components) is split into a plurality of simpler complex event formulae so as to establish a hierarchical complex event detection configuration model with sub- and sub-sub-levels. The simpler complex event detection nodes are distributed and then linked to one another in a publish-subscribe manner to establish a distributed event detection system having a function for distributed complex event detection.

The distributed event detection system according to the present embodiment may be applied to an event detection system for visualizing an acquirement state of components of a certain device. The distributed event detection system may also be applied to a mobile virtual network operator (MVNO) service in which a plurality of overlay networks is hierarchically established on top of a physical network. In particular, linkage of a fault event is shown by a complex event formula regarding an application node of each layer from a physical node level. In this manner, a transmitting state of the fault situation is shown in a perpendicular direction from the physical layer to the application layer, and an operation/fault state can be visualized. In this manner, the distributed event detection system may be applied to a network monitoring service.

In the distributed event detection system, system components are established on the Internet, an enterprise network and a mobile phone network. The distributed event detection system generates atomic events from the data generated at various terminals, and then detects, generates and notifies a complex event from a combination of the atomic events. In this manner, the distributed event detection system is used for providing a complex event detection service for visualizing various events in real space or network space.

Next, a splitting method of the complex event formula in the distributed event detection system will be described with reference to the drawings. FIG. 1 is a tree diagram that shows the splitting method of the complex event formula. FIG. 1 shows splitting an exemplary complex event formula F=((B AND C) OR A) AND (D OR E). The complex event formula shown in FIG. 1 is split by route nodes and complex event detection nodes, which will be described hereinbelow.

The distributed event detection system first splits the complex event formula F into three parts, in other words, ((B AND C) OR A), AND, and (D OR E) (step T1). Subsequently, the distributed event detection system further splits ((B AND C) OR A) into three parts, in other words, (B AND C), OR, and A (step T2). Subsequently, the distributed event detection system splits (B AND C) into B, AND, and C (step T3). The distributed event detection system splits (D OR E) into D, OR, and E (step T4).

With this procedure, the distributed event detection system creates a tree structure of the complex event formula as shown in FIG. 1. The tree-form data structure of the complex event formula is then provisioned to a distributed complex event detection system, as shown in FIG. 2.

Figure 2:
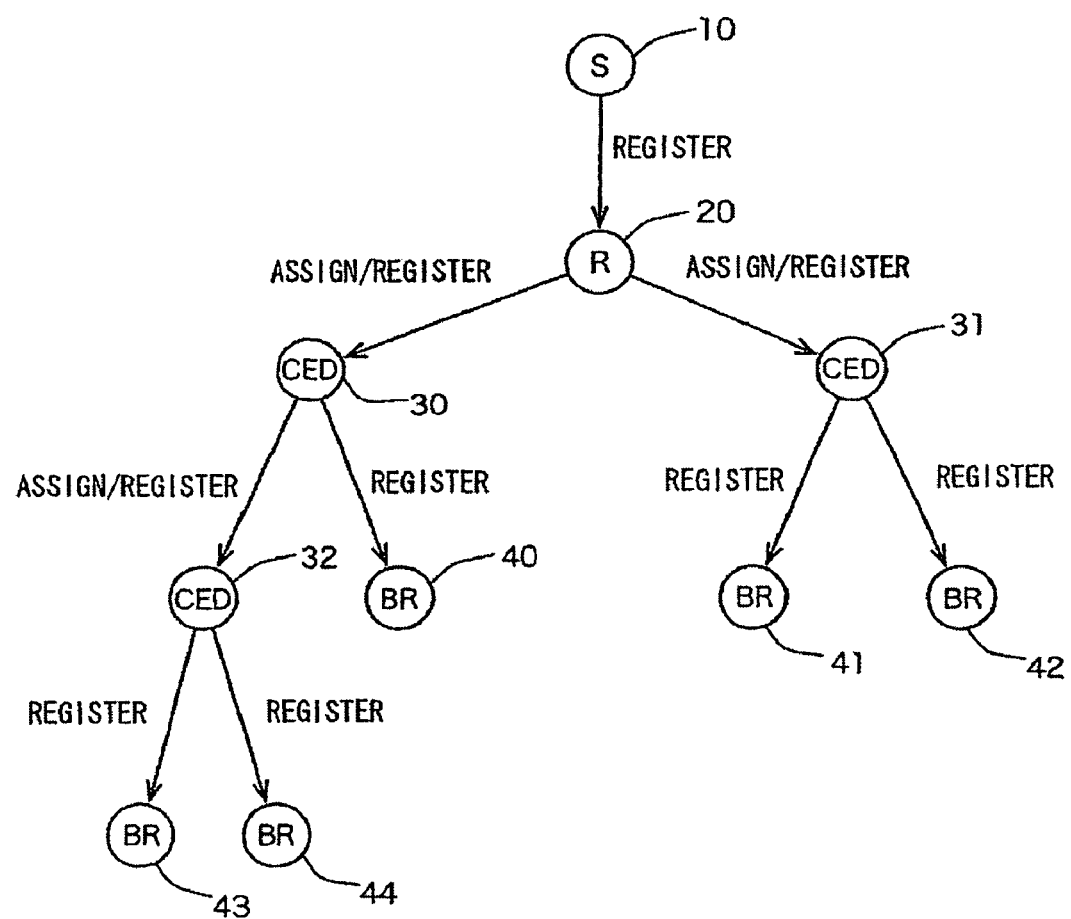
FIG. 2 is a tree diagram that shows a provisioning operation of a complex event detection system.

As shown in FIG. 2, the distributed event detection system includes a subscribe node 10, a route node 20, complex event detection nodes 30 to 32 and broker nodes 40 to 44. The distributed event detection system is constituted as a broker-based event distribution network with a plurality of broker nodes connected thereto. In the present embodiment, communication is established between the nodes via one or more broker nodes existing between the nodes. Adjacent nodes, however, may communicate directly with each other.

The subscribe node 10 is, for example, a server administrated by a service provider which provides various information, such as congestion information, to users. The subscribe node 10 distributes various information, such as congestion information, to terminals. Such as user mobile phones and personal computers, via a communication network, such as a mobile phone network and the Internet, based on a received (complex) event.

The subscribe node 10 is implemented as an information processing unit, such as a personal computer, which operates according to a program. Although a single subscribe node 10 is shown in FIG. 2, the distributed event detection system may include a plurality of subscribe nodes 10.

Figure 3:
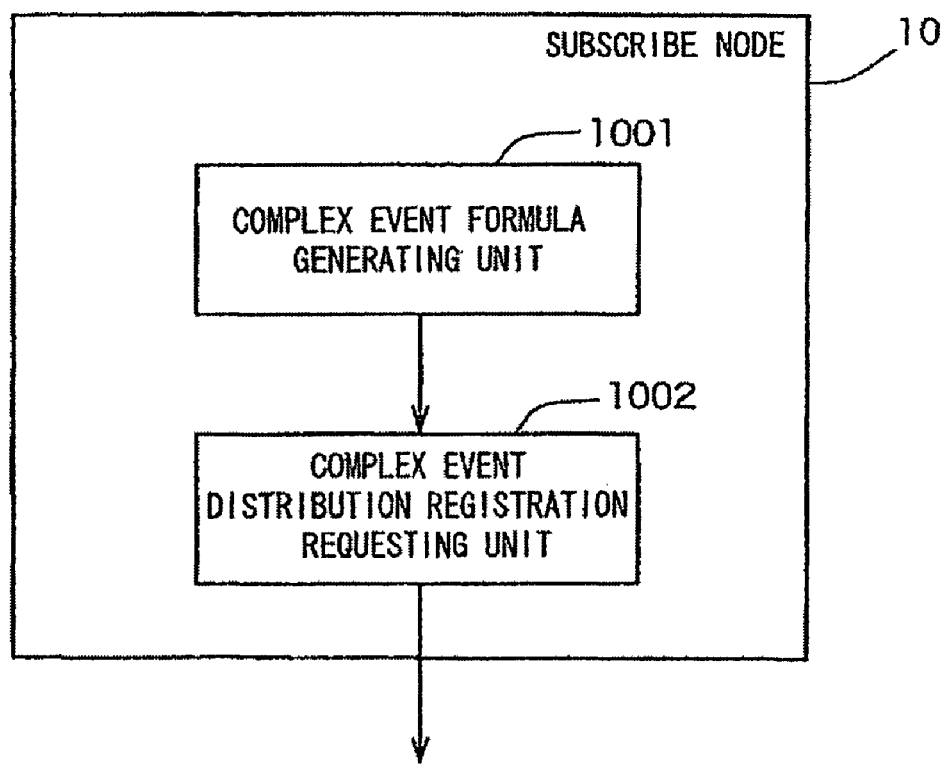
FIG. 3 is a block diagram that shows an example of a subscribe node configuration.

FIG. 3 is a block diagram that shows a configuration example of the subscribe node 10. The subscribe node 10 includes a complex event formula generating unit 1001 and a complex event distribution registration requesting unit 1002.

The complex event formula generating unit 1001 is implemented as a central processing unit (CPU) of the information processing unit which operates according to a program. The complex event formula generating unit 1001 generates the complex event formula F for detecting a complex event.

The complex event distribution registration requesting unit 1002 is implemented as a CPU and a network interface of the information processing unit which operate according to a program. The complex event distribution registration requesting unit 1002 transmits, to the route node 20, a complex event distribution registration request for registering a complex event to be subscribed. In this case, the complex event distribution registration requesting unit 1002 transmits, to the route node 20, a complex event distribution registration request which includes the complex event formula F generated by the complex event formula generating unit 1001.

The route node 20 is implemented as a network device such as an internet protocol (IP) router, and an information processing unit, such as a personal computer, which operates according to a program and has a router function. Although a single route node 20 is shown in FIG. 2, the distributed event detection system may include a plurality of route nodes 20.

Figure 4:
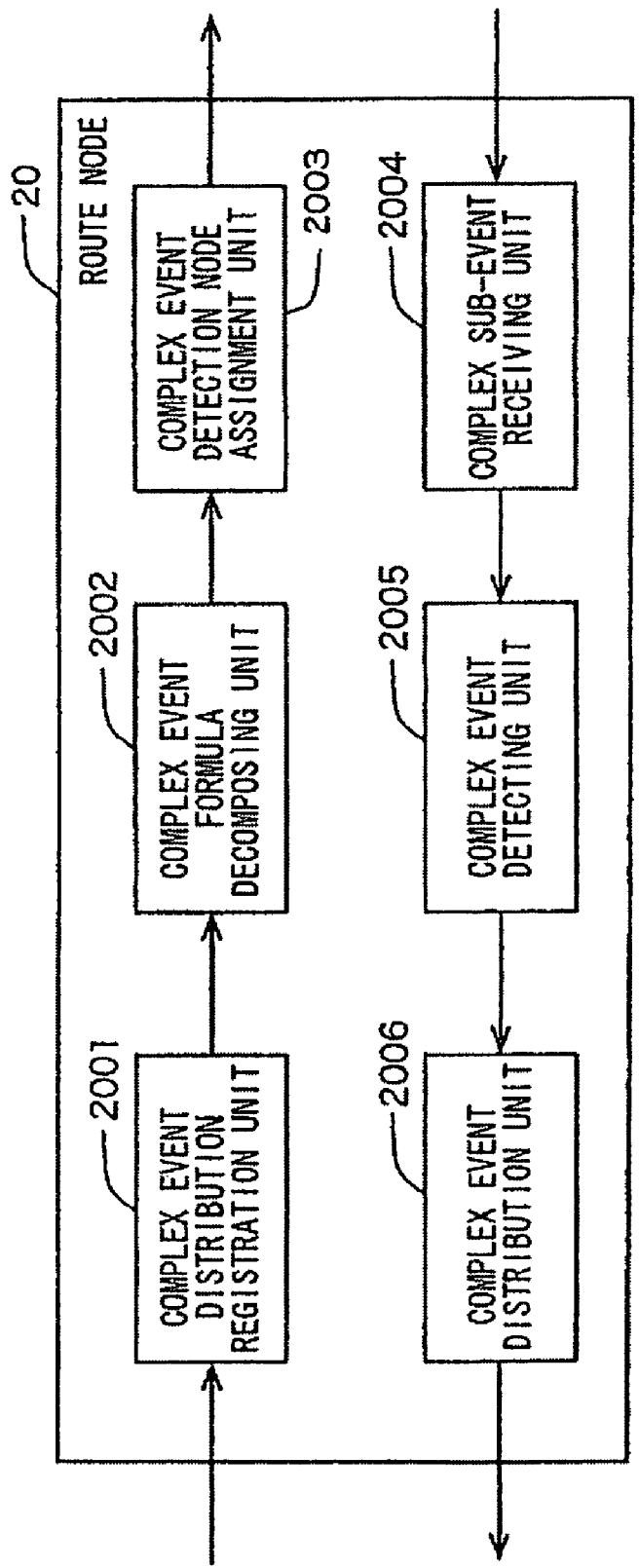
FIG. 4 is a block diagram that shows an example of a route node configuration.

FIG. 4 is a block diagram that shows a configuration example of the route node 20. The route node 20 includes a complex event distribution registration unit 2001, a complex event formula decomposing unit 2002, a complex event detection node assignment unit 2003, a complex sub-event receiving unit 2004, a complex event detecting unit 2005 and a complex event distribution unit 2006.

The complex event distribution registration unit 2001 registers a complex event to be distributed to the subscribe node 10, based on the complex event distribution registration request received from the subscribe node 10. In particular, the complex event distribution registration unit 2001 registers information (e.g., an event identification (event ID)) adapted to specify a to-be-distributed complex event in a routing table. The complex event distribution registration unit 2001 causes the complex event formula F generated by the subscribe node 10 to be stored in a memory storage, such as memory and hard disk drive unit, of the route node 20.

The complex event formula decomposing unit 2002 executes processes for decomposing the complex event formula F registered by the complex event distribution registration unit 2001 into a plurality of elements (i.e., complex sub-event formulae, atomic events and operators). For example, in the example shown in FIG. 1, the complex event formula decomposing unit 2002 decomposes the complex event formula into two complex sub-event formulae ((B AND C) OR A) and (D OR E), and an operator (AND).

The complex event detection node assignment unit 2003 assigns the complex event detection nodes 30 and 31 according to a predetermined rule with respect to the complex sub-event formulae decomposed by the complex event formula decomposing unit 2002. For example, the complex event detection node assignment unit 2003 selects a node with an event ID that is numerically close to the event ID of the decomposed complex sub-event as a complex event detection node among other broker nodes in the network. The complex event detection node may be selected by any method and therefore not limited to that described above. Alternatively, the complex event detection node assignment unit 2003 may select a broker node having the smallest current processing load as a complex event detection node.

The complex event detection node assignment unit 2003 transmits complex sub-event distribution registration requests to the assigned complex event detection nodes 30 and 31. In the present embodiment, the complex event detection node assignment unit 2003 transmits distribution registration requests including the complex sub-event formulae obtained by decomposition by the complex event formula decomposing unit 2002 to the complex event detection nodes 30 and 31.

If an element decomposed from the complex event formula F is an atomic event, the complex event detection node assignment unit 2003 transmits a distribution registration request for the atomic event to a broker node which relays the atomic event.

The complex sub-event receiving unit 2004 receives the complex sub-event (i.e., the complex sub-event detected by the complex event detection nodes 30 and 31) from the complex event detection nodes 30 and 31. If an atomic event is included in the elements decomposed from the complex event formula, the complex sub-event receiving unit 2004 receives the atomic event from the broker node which relays the atomic event.

The complex event detecting unit 2005 determines whether the complex event has been detected based on the complex sub-event and the atomic event received by the complex sub-event receiving unit 2004. In the example shown in FIG. 1, when both the complex sub-events ((B AND C) OR A) and (D OR E) are received, the complex event detecting unit 2005 determines that the formula corresponds to the complex event formula F, and determines that the complex event has been detected.

If the complex event detecting unit 2005 determines that the complex event has been detected, the complex event distribution unit 2006 distributes the detected complex event to the subscribe node 10.

The complex event detection nodes 30 to 32 are implemented as network devices, such as IP routers, and information processing units, such as personal computers, which operate according to a program and have a router function. Although three complex event detection nodes 30 to 32 are shown in FIG. 2, the distributed event detection system may alternatively have four or more complex event detection nodes.

Figure 5:
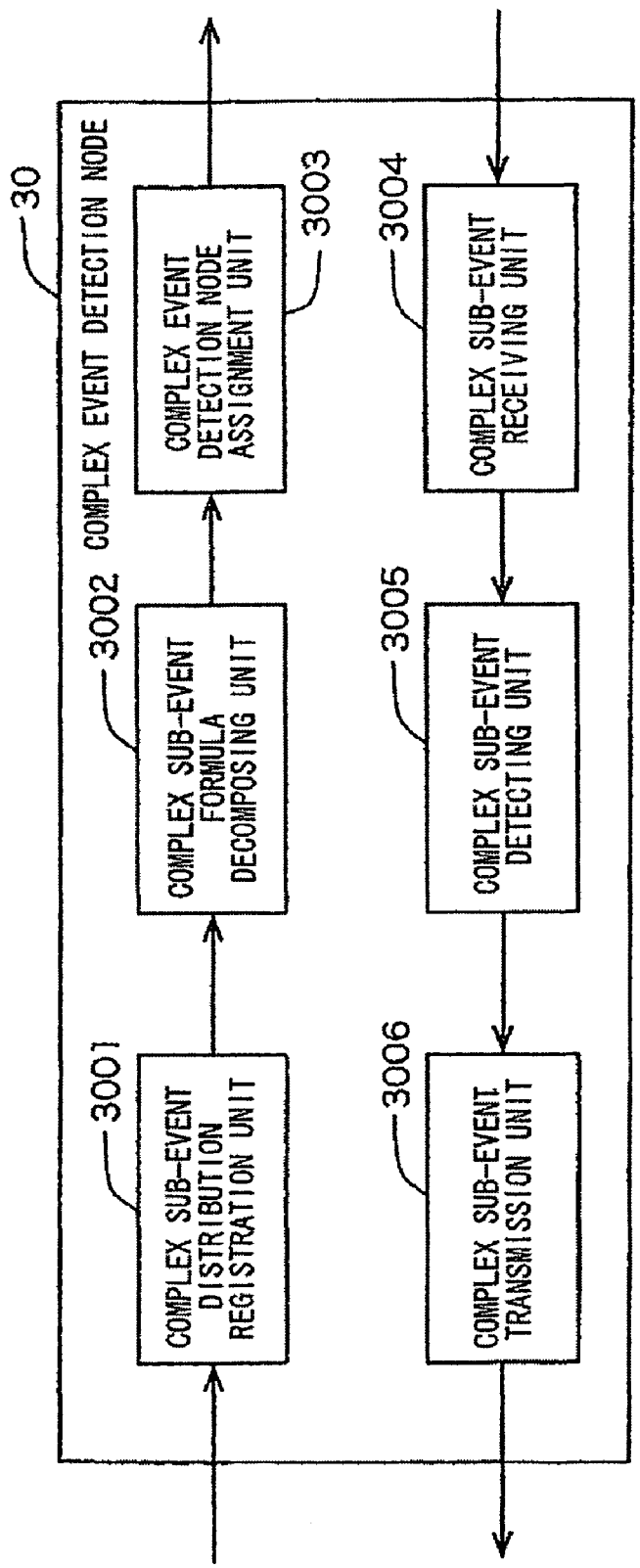
FIG. 5 is a block diagram that shows an example of a complex event detection node configuration.

FIG. 5 is a block diagram that shows a configuration example of the complex event detection node 30. The complex event detection node 30 includes a complex sub-event distribution registration unit 3001, a complex sub-event formula decomposing unit 3002, a complex event detection node assignment unit 3003, a complex sub-event receiving unit 3004, a complex sub-event detecting unit 3005 and a complex sub-event transmission unit 3006. The complex event detection nodes 31 and 32, which are not shown in FIG. 2, have the same configuration as that of the complex event detection node 30.

The complex sub-event distribution registration unit 3001 registers the complex sub-event distributed to the route node 20 or other complex event detection nodes based on the distribution registration request of the complex sub-event received from the route node 20 or other complex event detection nodes (i.e., high-order complex event detection nodes). In particular, the complex sub-event distribution registration unit 3001 registers information (e.g., the event ID) adapted to specify a to-be-distributed complex sub-event in a routing table. The complex sub-event distribution registration unit 3001 causes the complex sub-event formula decomposed by the route node 20 and other complex event detection nodes to be stored in a memory storage, such as memory and hard disk drive unit, of the complex event detection node 30.

The complex sub-event formula decomposing unit 3002 executes processes for decomposing the complex sub-event formula registered by the complex sub-event distribution registration unit 3001 into a plurality of elements (i.e., complex sub-event formulae, atomic events and operators). For example, in the example shown in FIG. 1, the complex sub-event formula decomposing unit 3002 decomposes the complex event formula ((B AND C) OR A) into the complex sub-event formula (B AND C), an atomic event A and an operator (OR). That is, the complex sub-event formula decomposing unit 3002 recursively decomposes the complex sub-event formula decomposed by the route node 20 and high-order complex event detection node into a plurality of elements (i.e., complex sub-event formulae, atomic events and operators).

The complex event detection node assignment unit 3003 assigns the complex event detection node 32 according to the predetermined rule with respect to the complex sub-event formulae decomposed by the complex sub-event formula decomposing unit 3002. For example, the complex event detection node assignment unit 3003 selects a node with an event ID that is numerically close to the event ID of the decomposed complex sub-event as a complex event detection node among other broker nodes in the network. That is, the complex event detection node assignment unit 3003 recursively assigns other broker nodes as the sub-route nodes with respect to the complex sub-event formula decomposed by the complex sub-event formula decomposing unit 3002. The complex event detection node may be selected by any method and therefore not limited to that described above. Alternatively, the complex event detection node assignment unit 3003 may select a broker node having the smallest current processing load as a complex event detection node.

The complex event detection node assignment unit 3003 transmits a complex sub-event distribution registration request to the assigned complex event detection node 32. In the present embodiment, the complex event detection node assignment unit 3003 transmits a distribution registration request including a complex sub-event formula obtained by decomposition by the complex sub-event formula decomposing unit 3002 to the complex event detection node 32.

If an element decomposed from the complex sub-event formula is an atomic event, the complex event detection node assignment unit 3003 transmits a distribution registration request for the atomic event to the broker node which relays the atomic event. For example, in the examples shown in FIGS. 1 and 2, the complex event detection node assignment unit 3003 transmits the distribution registration request for the atomic event A to the broker node 40.

The complex sub-event receiving unit 3004 receives the complex sub-event (i.e., complex sub-event detected by the complex event detection node 32) from the complex event detection node 32. If the atomic event is included in the elements decomposed from the complex sub-event formula, the complex sub-event receiving unit 3004 receives the atomic event from the broker node which relays the atomic event.

The complex sub-event detecting unit 3005 determines whether the complex sub-event has been detected based on the complex sub-event and the atomic event received by the complex sub-event receiving unit 3004. In the example shown in FIG. 1, when either of the complex sub-event (B AND C) and the atomic event A is received, the complex sub-event detecting unit 3005 determines that the received event corresponds to the complex sub-event formula ((B AND C) OR A), and determines that the complex sub-event has been detected. That is, the complex sub-event detecting unit 3005 recursively detects the complex sub-event based on the complex sub-event detected by each sub-route node assigned by the complex event detection node assignment unit 3003.

If the complex sub-event detecting unit 3005 determines that a complex sub-event has been detected, the complex sub-event transmission unit 3006 transmits the detected complex sub-event to the route node 20 or other complex event detection nodes.

The broker nodes 40 to 44 are implemented as network devices, such as IP routers, and information processing units, such as personal computers, which operate according to a program and have a router function. Although five broker nodes 40 to 44 are shown in FIG. 2, the distributed event detection system may alternatively have six or more broker nodes.

The broker nodes 40 to 44 register the atomic event to be distributed to the route node 20 or the complex event detection nodes 30 to 32 based on the distribution registration request of the atomic event received from the route node 20 or the complex event detection nodes 30 to 32. In particular, the broker nodes 40 to 44 register information (e.g., an event ID) adapted to specify a to-be-distributed atomic event in a routing table. When the atomic event is detected, the broker nodes 40 to 44 transmit the detected atomic event to the route node 20 or the complex event detection nodes 30 to 32.

All the broker nodes included in the network which constitutes the distributed event detection system may operate as route nodes. For example, every broker node included in the network may have the components shown in FIG. 4, and may be activated as a route node when assigned as a route node by the subscribe node 10.

Every broker node included in the network constituting the distributed event detection system may operate as a complex event detection node. For example, every broker node included in the network may include the components shown in FIG. 5, and may be activated as a complex event detection node when assigned as a complex event detection node by the route node 20 or other complex event detection nodes.

The publisher node (not shown in FIG. 2) is implemented as an information processing unit, such as a personal computer, which operates according to a program. The distributed event detection system may alternatively include two or more publisher nodes. When a detection signal is input from various sensors (e.g., a speed sensor) or a tag (e.g., a RFID tag), the publisher node generates an atomic event and transmits the generated atomic event to the subscribe node.

In the present embodiment, when the broker node which operates as a route node or a complex event detection node is implemented by using the information processing unit, the memory storage (not shown) of each broker node has stored therein various programs for distributing and detecting the complex events. For example, the memory storage of each broker node has stored therein a distributed event detection program for causing a computer to execute the following processes: a process for decomposing the complex event detection formula to detect the complex event into a plurality of complex sub-event detection formulae; a process for assigning another broker node as a sub-route node to each of the decomposed complex sub-event detection formulae; and a process for detecting a complex event based on the complex sub-event detected by the assigned sub-route node.

Figure 6:
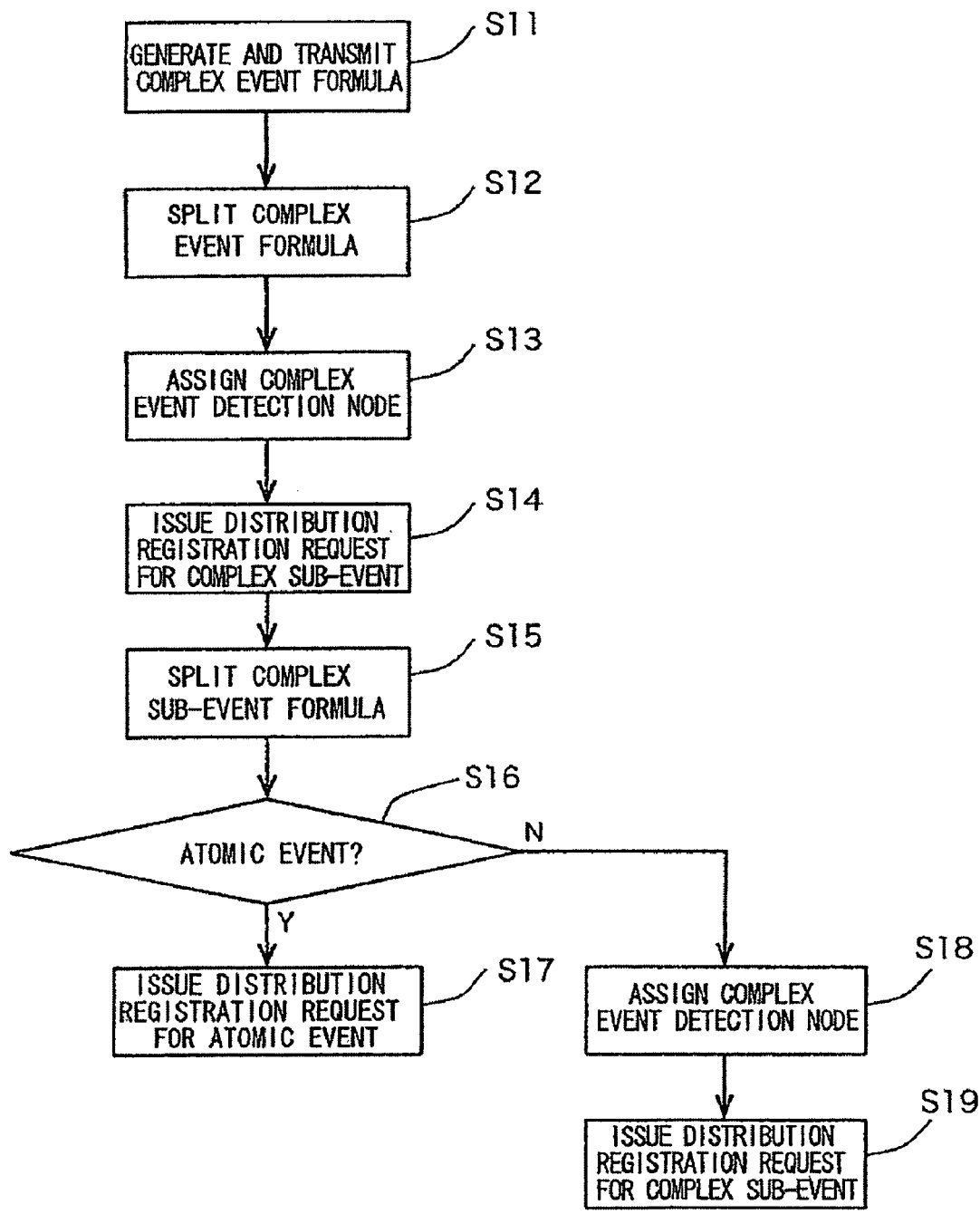
FIG. 6 is a flowchart that shows an example of a process for establishing a system configuration to distribute and detect a complex event.

Next, an operation, which distributes and detects the complex event, will be described. FIG. 6 is a flowchart that shows an example of a process for establishing a system configuration to distribute and detect the complex event. First, the subscribe node 10 transmits a complex event distribution registration request to the route node 20 according to, for example, an operation in the service provider. The subscribe node 10 generates, for example, a complex event formula F shown in FIG. 1 and transmits the complex event formula F to the route node 20 together with the complex event distribution registration request (step S11). Then, the route node 20 splits the complex event formula F of step T1 as shown in FIG. 1 (step S12). In the example shown in FIG. 1, the route node 20 decomposes the complex event formula F into complex sub-event formulae ((B AND C) OR A) and (D OR E), and an operator (AND).

Subsequently, the route node 20 assigns the complex event detection node 30 in order to detect the complex event ((B AND C) OR A) (step S 13). The route node 20 issues a distribution registration request for the complex sub-event with respect to the assigned complex event detection node 30 (step S14).

Subsequently, the complex event detection node 30 splits the complex sub-event formula ((B AND C) OR A) of step T2 shown in FIG. 1 in the same manner as in the route node 20 (step S15). In the example shown in FIG. 1, the complex event detection node 30 decomposes the complex sub-event formula into the complex sub-event formula (B AND C), an atomic event A, and an operator (OR).

During the splitting process of step S4, an event A appears in the decomposed element. The event A is considered as an event of the smallest unit that cannot be split any more (i.e., an atomic event herein). In the complex event formula F shown in FIG. 1, events A to E are the atomic events.

If affirmative in step S16, i.e., if an atomic event appears in the splitting process of step S4, the complex event detection node 30 issues a distribution registration request to the broker node 40 which distributes the atomic event (step S17). As a result, it is determined (e.g., registered in the routing table) that the broker node 40 distributes the atomic events to the complex event detection node 30.

If negative in step S16, i.e., if a complex sub-event appears in the splitting process of step S4, the complex event detection node 30 assigns the complex event detection node 32 (i.e., a low-order complex event detection node) in order to detect the complex sub-event (B AND C) (step S18). The complex event detection node 30 issues a distribution registration request for the complex sub-event with respect to the assigned complex event detection node 32 (step S19).

The processes of steps S5 to S9 are repeated until the complex sub-event is no longer included in the decomposed element. In this manner, a configuration process as shown in FIG. 2 is executed.

Figure 7:
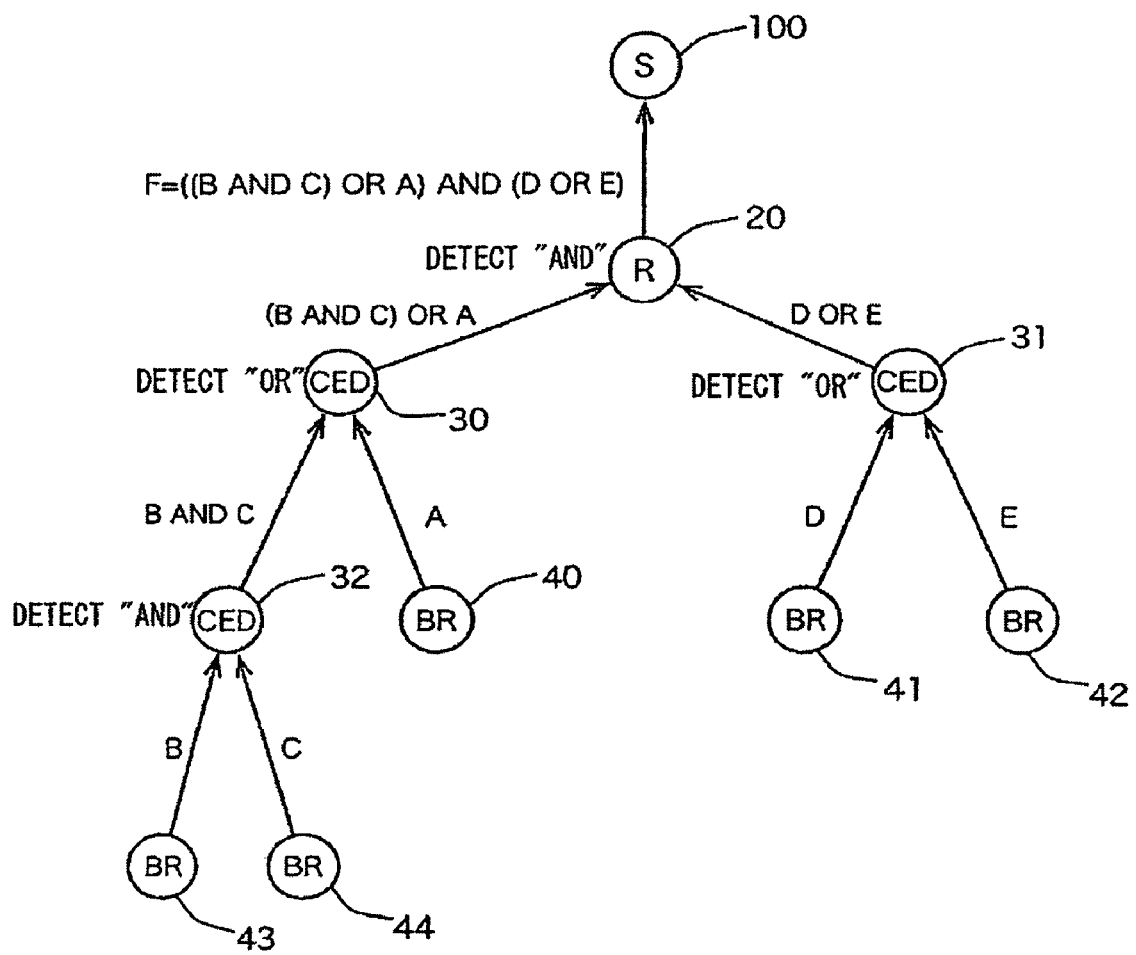
FIG. 7 is a tree diagram that shows a collecting operation of a complex event in the complex event detection system.

FIG. 7 shows a network structure for detecting a complex sub-event from atomic events and detecting a complex event based on the complex event formula F. The network structure shown in FIG. 7 is established by executing in reverse order the process of assigning the complex event detection node and issuing a distribution registration of the complex event and the atomic event. The network structure (i.e., the system configuration) for the complex event detection as shown in FIG. 7 is established by executing the process shown in FIG. 6.

Figure 8:
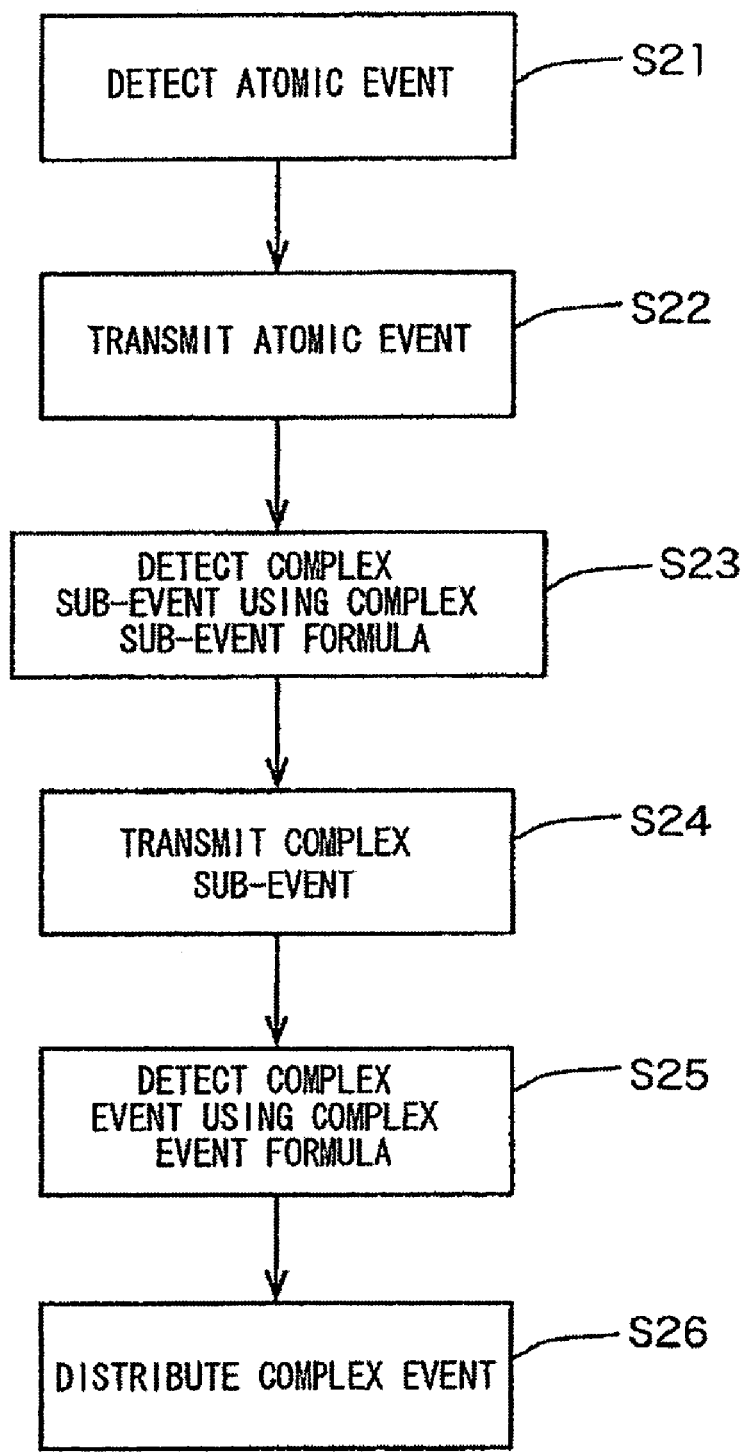
FIG. 8 is a flowchart that shows an example of a process for detecting the complex event in a distributed event detection system.

Next, an operation for detecting the complex event after the system configuration for distributing and detecting the complex event is established will be described. FIG. 8 is a flowchart that shows an example of a process for detecting the complex event in the distributed event detection system. First, the broker nodes 40 to 44 detect an atomic event (step S21)

and then transmit the detected atomic event to the complex event detection nodes 30 to 32 (step S22). The broker node may transmit the detected atomic event directly to the route node in some configurations established.

The complex event detection nodes 30 to 32 detect the complex sub-event based on the atomic event received from the broker nodes 40 to 44 and on the complex sub-event received from other complex event detection nodes (i.e., the low-order complex event detection nodes) (step S23). For example, in the example shown in FIG. 2, when either of the complex sub-event (B AND C) of the atomic event A is received, the complex event detection node 30 determines that the received event corresponds to the complex sub-event formula ((B AND C) OR A) and determines that the complex sub-event has been detected. When both the atomic events B and C are received, the complex event detection node 32 determines that the received events correspond to the complex sub-event formula (B AND C) and determines that the complex sub-event has been detected.

Then, the complex event detection nodes 30 to 32 transmit the detected complex sub-event to the route node 20 or other complex event detection nodes (i.e., the high-order complex event detection nodes) (step S24). In the example shown in FIG. 2, the complex event detection nodes 30 and 31 transmit the detected complex sub-event to the route node 20. The complex event detection node 32 transmits the detected complex event to the complex event detection node 30.

The route node 20 detects the complex event based on the complex sub-event received from the complex event detection nodes 30 and 31 (step S25). For example, in the example shown in FIG. 2, when both the complex sub-events ((B AND C) OR C) and (D OR E) are received, the route node 20 determines that the detected events correspond to complex event formula F, and determines that the complex event has been detected. Then, the route node 20 distributes the detected complex event to the subscribe node 10 (step S26). In the established configuration, the route node 20 may detect the complex event based on the atomic event received from the broker node in addition to the complex sub-event received from the complex event detection nodes 30 and 31.

As described above, according to the present embodiment, the complex event is formed from a combination of the atomic events in the low-order node (i.e., the complex event detection node) of the distributed complex event detection system (i.e., the distributed event detection system), and the complex events are combined in a stepped manner. Accordingly, the highest-order route node (which corresponds to the process server in the related art disclosed in JP 2006-309701 A) receives only notification regarding the occurrence of the last event (i.e., the occurrence of the complex sub-event immediately before the last complex event). In this manner, the traffic focusing on the highest-level server (i.e., the route node 20) can be avoided. With this configuration, redundant link occupation at the side of the server can be reduced and the load for the complex event detection can also be reduced.

EXAMPLES

Figure 9:
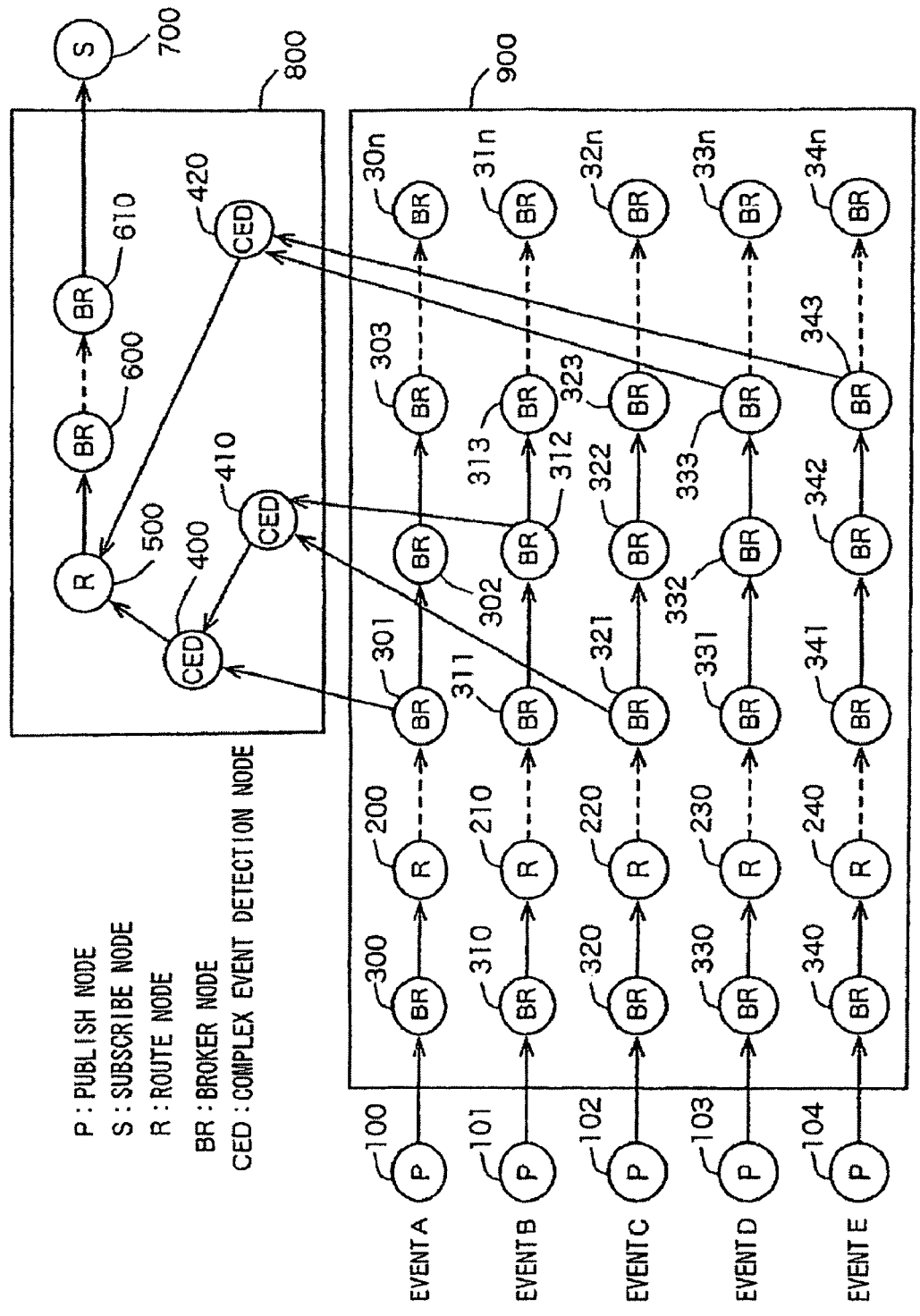
FIG. 9 is a schematic diagram that shows an example of a distributed event detection system established on an overlay network.

Next, an exemplary distributed event detection system according to the present invention will be described. FIG. 9 is a schematic diagram that shows an example of a distributed event detection system established on an overlay network. The distributed event detection system includes publish nodes 100 to 104, broker nodes 300 to 34$n$, 600 and 610, route nodes 200 to 240 and 500, complex event detection nodes 400 to 420 and a subscribe node 700. The broker nodes 300 to 34$n$, the route nodes 200 to 240 and the complex event detection nodes 400 to 420 may be implemented in the same device.

In FIG. 9, the system including the route node 500, the broker nodes 600 and 610 and the complex event detection nodes 400 to 420 is a complex event detection system 800 adapted to detect a complex event. In FIG. 9, the system including the route nodes 200 to 240 and the broker nodes 300 to 34$n$ is an atomic event distribution system 900 adapted to distribute the atomic event.

In FIG. 9, the atomic event distribution system 900 and the complex event detection system 800 are separately established on dedicated overlay networks. The route nodes 200 to 240, the broker nodes 300 to 34$n$ and the complex event detection node 400 for distributing atomic events are connected to both the overlay networks. In this example, the broker nodes and the route nodes are established on the overlay network.

The overlay networks may be a distributed hash table (DHT) model network or a peer to peer (P2P) network. In this example, the overlay network is considered as a DHT model network.

In establishment of the overlay network, the complex event detection system 800 of the example may be divided into two functional divisions in order to clarify the relationship between application and implementation: the complex event detection (constituted by the complex event detection nodes 400 to 420); and the complex event distribution (constituted by the route node 500 and broker nodes 600 and 610). With this configuration, the distributed event detection system is established as a multi-overlay network with node groups for detecting distributed events. The multi-overlay network may include: a dedicated overlay network provided mainly for the distributed event detection; a dedicated overlay network provided mainly for the atomic event routing; and a dedicated overlay network provided mainly for routing the complex event.

Regarding the complex event distribution, the complex event detection system 800 may prepare overlay network space for each user, and divide the space into complex event distribution space dedicated to each user.

Among the broker nodes 300 to 34$n$, 600 and 610, the broker nodes 300, 310, 320, 330, 340 and 610 located at a network edge have connection points with carrier networks, such as the Internet, a mobile phone network, and a next-generation network (NGN). Accordingly, the publish nodes 100 to 104 and the subscribe node 700 are connected to the broker node of the network edge by, for example, protocols such as a transmission control protocol/internet protocol (TCP/IP) and a hypertext transfer protocol (HTTP).

The access points are represented in a port/address format by the TCP/IP in the Internet, or represented by a uniform resource locator (URL) in the HTTP. In a mobile phone system in a third generation partnership project (3GPP), the access points may be identified by the access point name. With these access points, client software on the terminal is connected to the subscribe node 700 and is connected to the complex event detection system 800 shown in FIG. 9 in a transparent manner. The publish nodes 100 to 104 are also connected to the atomic event distribution system 900 in a similar manner.

The publish nodes 100 to 104 collect sensor data as numerical data from, for example, one or more sensors, and detect change of external status shown by the data group as an event. If the data group includes several elements, the publish nodes 100 to 104 detect the maximum value, the minimum value, an average value, data variation and difference as factors of the state change. A data generation source of the publish nodes 100 to 104 is not limited to hardware devices, such as sensors, and may be monitor software which monitors an operation condition of a certain software.

In this example, the events A to E shown in FIG. 9 are the atomic events. A distribution path of the atomic event A is defined from the publish node 100 to a broker node 30n. Similar distribution paths for the events B to E are illustrated in FIG. 9.

The atomic events A to E are distributed to the route nodes 200 to 204 for each atomic event and then distributed via, for example, a multicasting tree. For example, the route node 200 is for distributing the atomic event A. If the subscribe node 700 performs reception registration of the atomic event A, the atomic event A is added to the multicasting tree (not shown in FIG. 9).

The subscribe node 700 creates the complex event formula F using the atomic events A to E which have received the distribution. For example, in a process of monitoring a manufacturing process of a certain device, the subscribe node 700 creates a complex event formula for monitoring the manufacturing process of five assumed components A to E using a RFID tag.

Next, the subscribe node 700 determines the route node 500 for the complex event distribution. For example, the subscribe node 700 generates an ID which is unique in the complex event detection network system by, for example, a hash function using information of the user of the subscribe node 700 (including name, address, date of birth and staff number) as key data. Then, the subscribe node 700 determines a node with a DHT node ID that is identical with or numerically close to the generated ID as a route node.

Next, the subscribe node transmits the complex event formula F as the registration information to the above-described route node 500. The route node 500 which received the complex event formula splits the complex event formula F by the same process as that shown in the first embodiment.

In the distributed complex event node detection system including the route node 500 and the complex event detection nodes 400 to 420, a configuration model (i.e., an arrangement model with distributed abstractive functions) is established for detecting the complex events according to a process similar to that of the first embodiment.

The above-described configuration is then provisioned (i.e., functions such as a software process of interest is actually activated) in the real network. The route node 500 is first assigned to the complex event formula F. The route node 500 creates the above-described configuration. In the example shown in FIG. 1, an AND operation is generated in step T1, which will be executed by the route node 500.

Next, the route node 500 of the complex event generates two unique IDs by using, for example, a hash function in order to specify the sub-route node (namely, the complex event detection nodes 400 and 420) for executing the AND operation in step T1 of FIG. 1. Nodes with a DHT node ID that is identical with or numerically close to the generated ID operate as the complex event detection nodes 400 and 420. The route node 500 registers ((B AND C) OR A) and (D OR E) with respect to the assigned sub-route node (namely, the complex event detection nodes 400 and 420).

The same process is repeated for steps T2 to T4 shown in FIG. 1 and a configuration model for detecting the complex event is established.

In steps T2 to T4 shown in FIG. 1, the atomic event appears as a decomposed element. When the atomic event appears, the route node 500 and the complex event detection nodes 400 to 420 perform reception registration with respect to the atomic event distribution network (namely, the atomic event distribution system 900). Then, after the atomic event is detected, the route node 500 and the complex event detection nodes 400 to 420 receive the corresponding atomic event from one of the broker nodes. For example, the complex event detection node 420 receives distribution of the atomic events B and C from the broker nodes 312 and 321.

The complex event detection nodes 400 to 420 detect the complex sub-event and notify the high-order nodes (namely, the route node 500 and the high-order complex event detection nodes) of the occurrence of die complex sub-event. The lowest-order complex event detection node receives the atomic event from the broker node. For example, the complex event detection node 410 receives the atomic events B and C, detects a complex event from the atomic events B and C, and notifies the complex event detection node 400 of the detection result.

The complex events similarly notified from the complex event detection nodes 400 to 420 are collected to the route node 500 for the complex events. The route node 500 then detects the complex event and notifies the subscribe node 700 of the detected complex event. In FIG. 9, the broker nodes 600 and 610 existing between the route node 500 and the subscribe node 700 demonstrate that a broker network exists also between the route node 500 and the subscribe node 10.

In this process, the distributed complex event detection system (distributed event detection system) is established.

As described above, according to the present example, the complex event is formed from a combination of the atomic events in the low-order node of the distributed complex event detection system, and the complex events are combined in a stepped manner. Accordingly, the highest-order route node receives only notification regarding the occurrence of the last event. In this manner, the traffic focusing on the highest-level server (i.e., the route node 500) can be avoided. With this configuration, redundant link occupation at the side of the server can be reduced and the load for the complex event detection can also be reduced.

Figure 10:
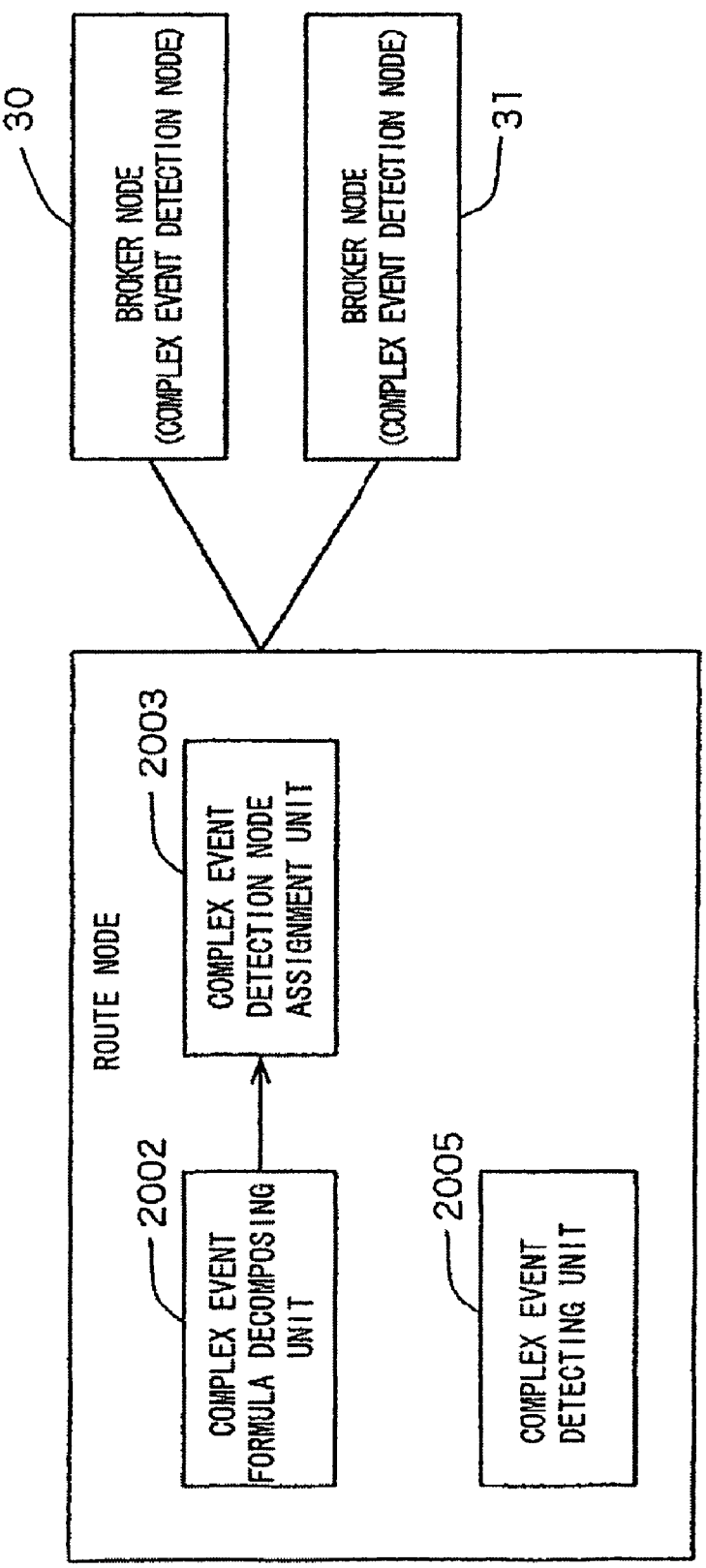
FIG. 10 is a block diagram that shows a minimum configuration of the distributed event detection system.

Next, a minimum configuration of the distributed event detection system according to the present invention will be described. FIG. 10 is a block diagram that shows the minimum configuration of the distributed event detection system. The distributed event detection system at least includes a plurality of broker nodes 30 and 31 (assigned as complex event detection nodes as described later) for routing events, and the route node 20 for distributing the complex event. The route node 20 at least includes a complex event formula decomposing unit 2002, a complex event detection node assignment unit 2003 and a complex event detecting unit 2005.

In the distributed event detection system with the minimum configuration shown in FIG. 10, the complex event formula decomposing unit 2002 decomposes the complex event formula for detecting the complex event into a plurality of complex sub-event formulae. The complex event detection node assignment unit 2003 assigns the broker nodes 30 and 31 as the complex event detection nodes to the complex sub-event formulae obtained by decomposition by the complex event formula decomposing unit 2002. The complex event detecting unit 2005 detects the complex event, based on the complex sub-events detected by the complex event detection nodes 30 and 31 assigned by the complex event detection node assignment unit 2003.

According to the distributed event detection system with the minimum configuration shown in FIG. 10, redundant link occupation at the side of the route node can be reduced and the load for the complex event processing can also be reduced.

The present embodiment has characteristic configurations of the distributed event detection system as described hereinafter.

A distributed event detection system for detecting a complex event by a distributed detection process, the system including: a plurality of broker nodes (namely, the broker nodes 30 and 31 assigned as complex event detection nodes) for routing events; and a route node (namely, the route node 20) for distributing the complex event, wherein the route node including: a detection formula decomposing unit (e.g., implemented as the complex event formula decomposing unit 2002) which decomposes a complex event detection formula (namely, the complex event formula F) for detecting the complex event into a plurality of complex sub-event detection formulae (namely, the complex sub-event formulae); a sub-route node assignment unit (e.g., implemented as the complex event detection node assignment unit 2003) which assigns a broker node (namely, the complex event detection nodes 30 and 31) as a sub-route node with respect to each of the complex sub-event detection formulae decomposed by the detection formula decomposing unit; and a complex event detecting unit (e.g., implemented as the complex event detecting unit 2005) which detects the complex event based on a complex sub-event detected by the sub-route node assigned by the sub-route node assignment unit.

In the distributed event detection system, the sub-route node may include: a detection formula recursive decomposing unit (e.g., implemented as the complex sub-event formula decomposing unit 3002) which recursively decomposes the complex sub-event detection formulae decomposed by the route node or another sub-route node into a plurality of complex sub-event detection formulae; a sub-route node recursive assignment unit (e.g., implemented as the complex event detection node assignment unit 3003) which recursively assigns another broker node (namely, the complex event detection node 32) as the sub-route node to each of the complex sub-event detection formulae decomposed by the detection formula recursive decomposing unit; and a complex sub-event detecting unit (e.g., implemented as the complex sub-event detecting unit 3005) which recursively detects the complex sub-event based on the complex sub-event detected by the sub-route node assigned by the sub-route node recursive assignment unit.

In the distributed event detection system, the subscribe node (namely, the subscribe node 10) may include a complex event detection formula generating unit (e.g., implemented as the complex event formula generating unit 1001) which generates a complex event detection formula; and the detection formula decomposing unit may decompose the complex event detection formula generated by the subscribe node into a plurality of complex sub-event detection formulae.

In the distributed event detection system, the broker node and the route node may be deployed on an overlay network.

The distributed event detection system may further include a node group (namely, the complex event detection nodes 400 to 420) for detecting the distributed event, wherein the distributed event detection system may be established as a multi-overlay network including: a dedicated overlay network provided mainly for distributed event detection; a dedicated overlay network provided mainly for atomic event routing; and a dedicated overlay network provided mainly for routing the complex event.

The distributed event detection system according to the present embodiment may be applied to an event detection system for visualizing an acquirement state of components of a certain device. The distributed event detection system may also be applied to an MVNO service in which a plurality of overlay networks is hierarchically established on top of a physical network. In particular, linkage of a fault event is shown by a complex event formula regarding an application node of each layer from a physical node level. In this manner, a transmitting state of the fault situation is shown in a perpendicular direction from the physical layer to the application layer, and an operation/fault state can be visualized. In this manner, the distributed event detection system may be applied to a network monitoring service.

According to the present invention, redundant link occupation at the side of the route node can be reduced and the load for the complex event processing can also be reduced.

Accordingly, while the preferred embodiment of the invention have been described and illustrated above, it should be understood that it is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A distributed event detection system for detecting a complex event by a distributed detection process, said distributed event detection system comprising:
a plurality of broker nodes that executes event routing; and
a route node that distributes said complex event, wherein said route node comprises: a detection formula decomposing unit configured to decompose a complex event detection formula that detects said complex event into a plurality of complex sub-event detection formulae;
a sub-route node assignment unit which assigns a broker node as a sub-route node with respect to each of said complex sub-event detection formulae decomposed by said detection formula decomposing unit; and
a complex event detecting unit configured to detect said complex event based on a complex sub-event detected by said sub-route node assigned by said sub-route node assignment unit; and
wherein said sub-route node comprises:
a detection formula recursive decomposing unit configured to recursively decompose said complex sub-event detection formulae decomposed by said route node or another sub-route node into a plurality of complex sub-event detection formulae;
a sub-route node recursive assignment unit configured to recursively assign another broker node as said sub-route node to each of said complex sub-event detection formulae decomposed by said detection formula recursive decomposing unit; and
a complex sub-event detecting unit configured to recursively detect said complex sub-event based on said complex sub-event detected by said sub-route node assigned by said sub-route node recursive assignment unit.

2. A distributed event detection system according to claim 1, wherein: said subscribe node includes a complex event detection formula generating unit configured to generate a complex event detection formula; and said detection formula decomposing unit decomposes said complex event detection formula generated by said subscribe node into a plurality of complex sub-event detection formulae.

3. A distributed event detection system according to claim 1, wherein said broker node and said route node are deployed on an overlay network.

4. A distributed event detection system according to claim 3, further comprising a node group that detects said distributed event, wherein said distributed event detection system is established as a multi-overlay network including: a dedicated overlay network provided mainly for distributed event detection; a dedicated overlay network provided mainly for atomic event routing; and a dedicated overlay network provided mainly for routing said complex event.

5. A broker node incorporated in a distributed event detection system for detecting a complex event by a distributed detection process, said broker node comprising:
- a function to operate as a route node configured to distributes said complex event;
- a detection formula decomposing unit configured to decompose a complex event detection formula that detects said complex event into a plurality of complex sub-event detection formulae;
- a sub-route node assignment unit configured to assign another broker node as a sub-route node with respect to each of said complex sub-event detection formulae decomposed by said detection formula decomposing unit; and
- a complex event detecting unit configured to detect said complex event based on a complex sub-event detected by said sub-route node assigned by said sub-route node assignment unit; and
- a function to operate as a sub-route node;
- a detection formula recursive decomposing unit configured to recursively decompose said complex sub-event detection formulae decomposed by said route node or another sub-route node into a plurality of complex sub-event detection formulae;
- a sub-route node recursive assignment unit configured to recursively assign another broker node as said sub-route node to each of said complex sub-event detection formulae decomposed by said detection formula recursive decomposing unit; and
- a complex sub-event detecting unit configured to recursively detects said complex sub-event based on said complex sub-event detected by said sub-route node assigned by said sub-route node recursive assignment unit.

6. A distributed event detection method for detecting a complex event by a distributed detection process, said distributed event detection method comprising:
- decomposing, by a route node that distributes said complex event, a complex event detection formula that detects said complex event into a plurality of complex sub-event detection formulae;
- assigning, by said route node, one of a plurality of broker nodes that executes routing said event as a sub-route node with respect to each of said decomposed complex sub-event detection formulae; and
- detecting, by said route node, said complex event based on a complex sub-event detected by said assigned sub-route node; and
- recursively decomposing, by said sub-route node, said complex sub-event detection formulae decomposed by said route node or another sub-route node into a plurality of complex sub-event detection formulae;
- recursively assigning, by said sub-route node, another broker node as said sub-route node with respect to each of said decomposed complex sub-event detection formulae; and
- recursively detecting, by said sub-route node, said complex sub-event based on said complex sub-event detected by said assigned sub-route node.

7. A distributed event detection unit stored on memory for detecting a complex event by a distributed detection process, said distributed detection process comprising causing a computer to execute steps of:
- decomposing a complex event detection formula configured to detect said complex event into a plurality of complex sub-event detection formulae;
- assigning another broker node as a sub-route node to each of said decomposed complex sub-event detection formulae; and
- detecting said complex event based on said complex sub-event detected by said assigned sub-route node; and
- recursively decomposing said complex sub-event detection formulae decomposed by said route node or another sub-route node into a plurality of complex sub-event detection formulae;
- recursively assigning another broker node as said sub-route node with respect to each of said decomposed complex sub-event detection formulae; and
- recursively detecting said complex sub-event based on said complex sub-event detected by said assigned sub-route node.

* * * * *